United States Patent [19]

Carlsson et al.

[11] 4,129,992

[45] Dec. 19, 1978

[54] LAYING TOOL FOR LAYING OF SUBMARINE CABLES INTO A SEA-BOTTOM

[75] Inventors: Stig T. Carlsson, Spånga; Bo M. Rasmusson, Handen; Viktor Scuka, Upplands Bälinge, all of Sweden

[73] Assignee: Telefonaktiebolaget L M Ericsson, Stockholm, Sweden

[21] Appl. No.: 789,148

[22] Filed: Apr. 20, 1977

[30] Foreign Application Priority Data

May 3, 1976 [SE] Sweden ............................... 7605035

[51] Int. Cl.$^2$ ............................................... E02F 5/02
[52] U.S. Cl. .................................. 405/164; 37/80 R; 405/168
[58] Field of Search ............ 61/72.4, 105; 37/193, 37/80 R, 80 A

[56] References Cited

U.S. PATENT DOCUMENTS

| 734,615 | 7/1903 | Roberts | 61/72.4 |
|---|---|---|---|
| 2,099,527 | 11/1937 | Lawton | 61/72.4 |
| 3,462,963 | 8/1969 | Moore | 61/72.4 |
| 3,717,003 | 2/1973 | Bates et al. | 61/72.4 |
| 3,898,852 | 8/1975 | Ezoe et al. | 61/72.4 |
| 4,053,998 | 12/1975 | Ezoe | 61/72.4 X |

*Primary Examiner*—Jacob Shapiro
*Attorney, Agent, or Firm*—Hane, Roberts, Spiecens & Cohen

[57] ABSTRACT

Laying tool for laying of submarine cable in a sea-bottom trench. The tool comprises a drag unit and a pulling tube joined by a cardanic suspension and drawn by a vessel for use under variable sea and bottom conditions. The cable is laid out from the vessel through the pulling tube, a canal in the drag unit, and, finally, into a sea-bottom trench formed by a ploughing device on the drag unit. This unit is constructed so that the cable is forced down onto the bottom of the trench even if the unit is not operating in a proper position due to a rough sea-bottom. Moreover, the drag unit is constructed so that all material turned up from the sea-bottom is pushed aside from the trench and the ploughing device. The laying tool is also provided with floating tanks adjusted so that the drag unit without cable will float but with cable it will sink. The tanks may be filled with both water and air to facilitate submergence and refloating of the drag unit.

23 Claims, 11 Drawing Figures

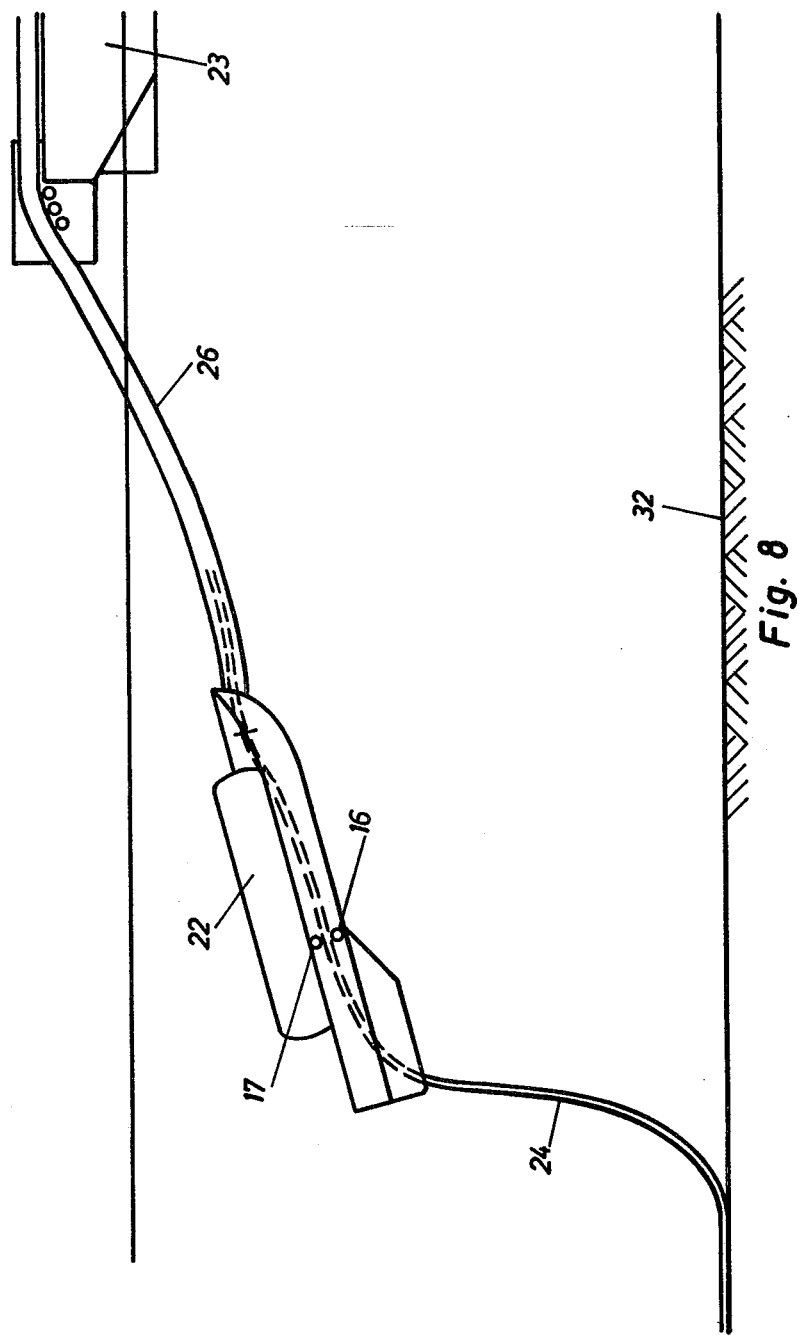

LAYING TOOL FOR LAYING OF SUBMARINE CABLES INTO A SEA-BOTTOM

BACKGROUND OF THE INVENTION

Submarine cables for power supply, telecommunications and the like can in the most cases not be laid down directly on the sea-bottom but has to be protected against, for example, floating ice, fishing-tackle, anchors and the like. The cable can either be covered with, for example, iron blocks and cement sacks or the cable can be brought down into the bottom material, for example, by digging and ploughing. The alternative of covering of the cable is mostly very expensive and time-wasting and this method has earlier been used only when it was considered necessary. For digging of cable trenches dredgers have been used. This method is expensive, technically difficult to master and limited to shallow waters. Apparatus for digging cable trenches and simultaneous laying of cable are previously known, for example in Swedish Patent No. 322,279. The known arrangements have, however, been intended to work in loose bottom materials such as sand, mud, soft clay and the like. The aim has principally also been to lay down weaker cables or water conduits in relatively calm waters inside a belt of islands. These arrangements are scarcely applicable for ocean operations, hard and rough bottom and heavy cable constructions as, for example, armoured power cables. Even arrangements for similar operations are previously known, with unsatisfying results in certain cases, among other things the difficulties have been great really to have the cable dug down.

SUMMARY OF THE INVENTION

The purpose of the present invention is to asure digging down of power cables in varying sea and bottom states that can be expected in practice. The laying tool is constructed in order to manage all reasonable strains inside as well as outside the belt of islands. The invention is described more in detail here below with the aid of the accompanying drawings.

BRIEF DESCRIPTION OF THE DRAWINGS

FIG. 8 shows a laying tool during refloating from or immersion to the sea-bottom.

DETAILED DESCRIPTION

Figure 1:
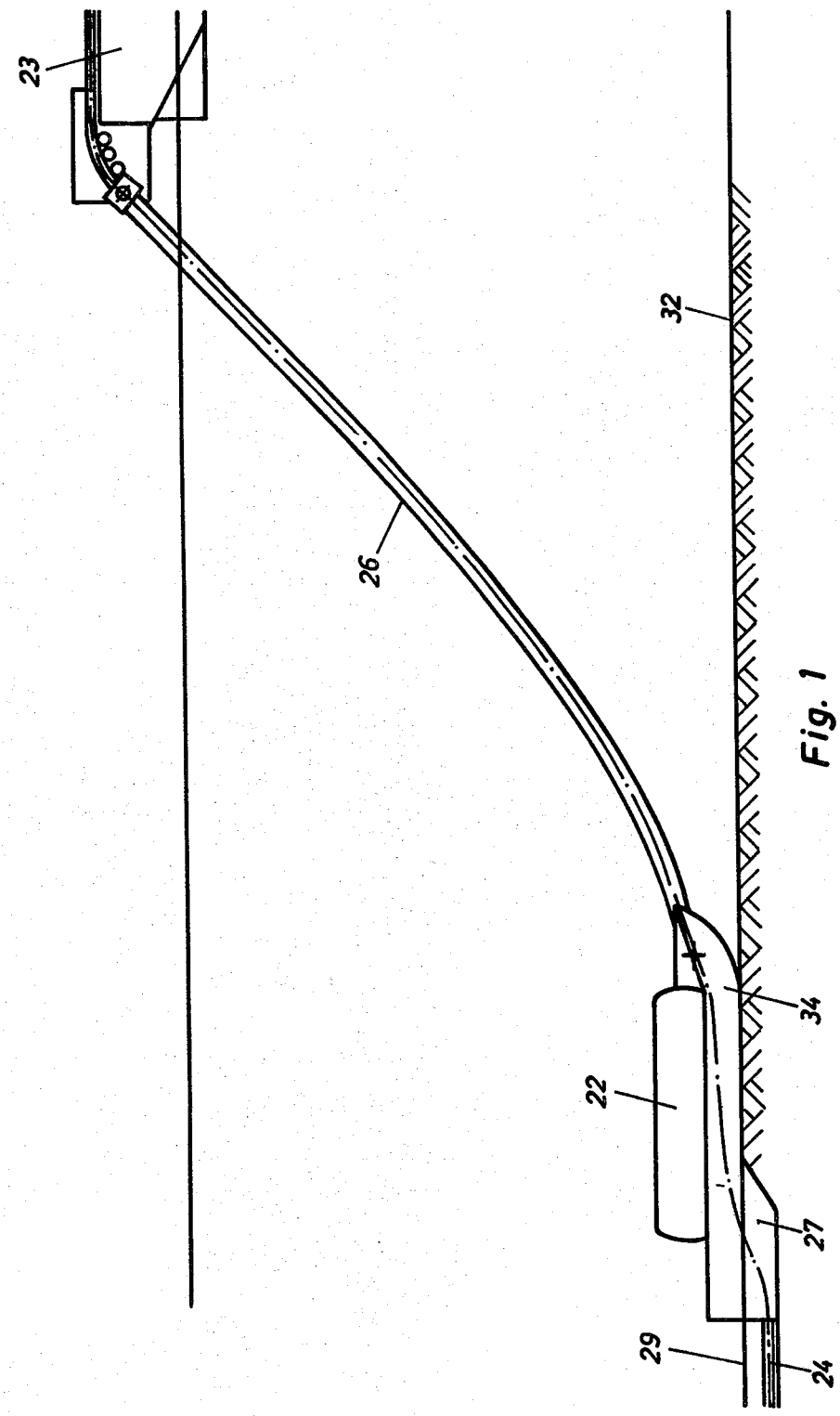
FIG. 1 is a side view of the laying tool and the pulling vessel.
Figure 2:
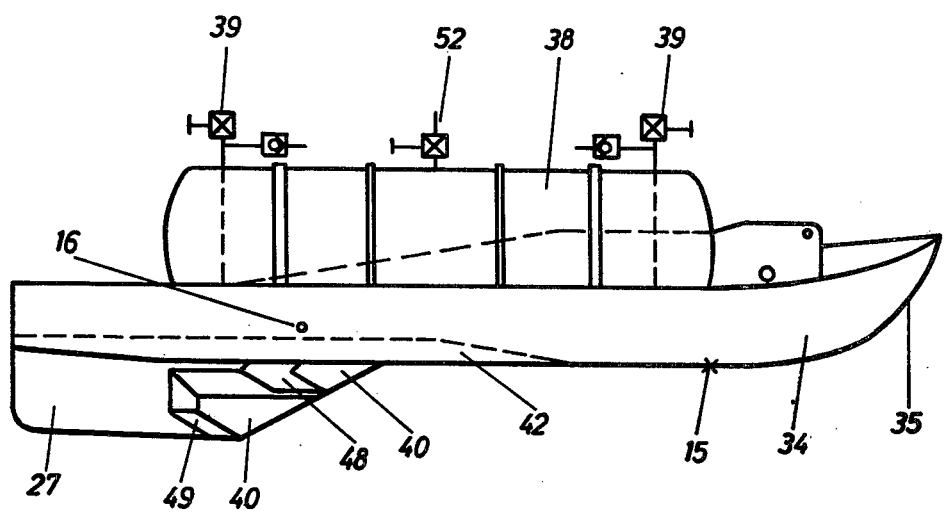
FIG. 2 shows the drag unit of the laying tool, seen in side view.
Figure 3:
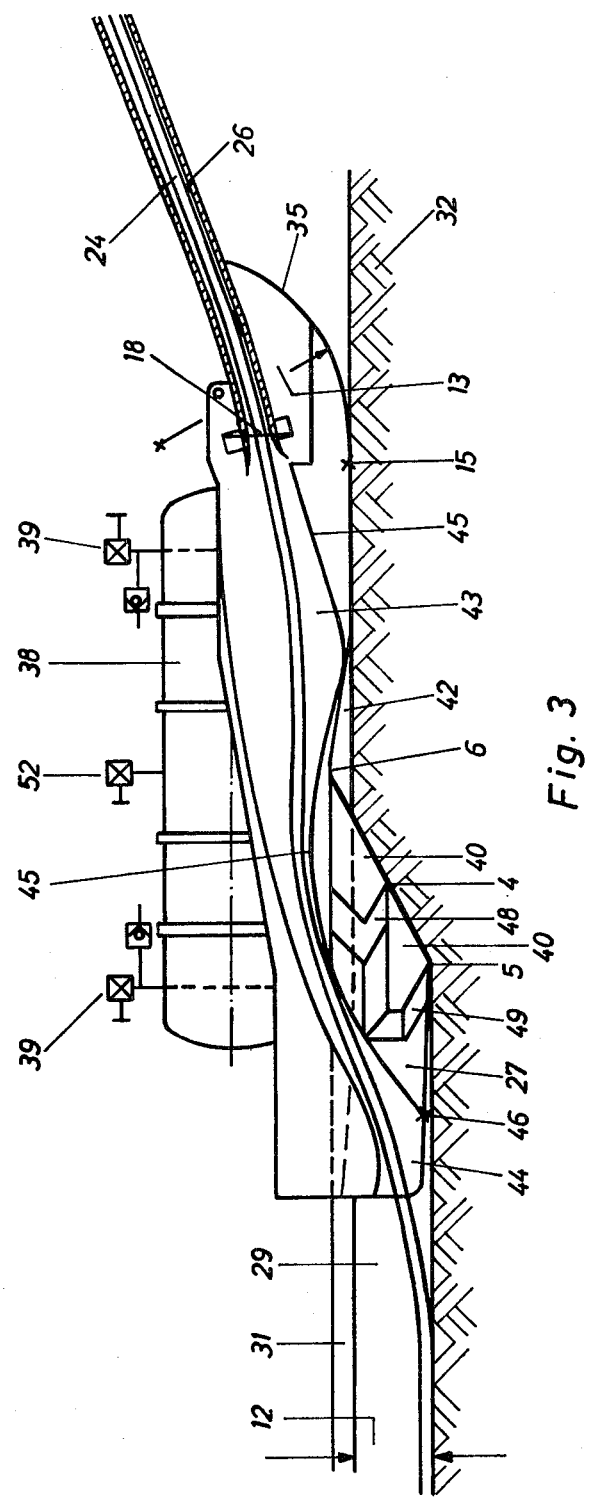
FIG. 3 is a longitudinal section through the laying tool.
Figure 4:
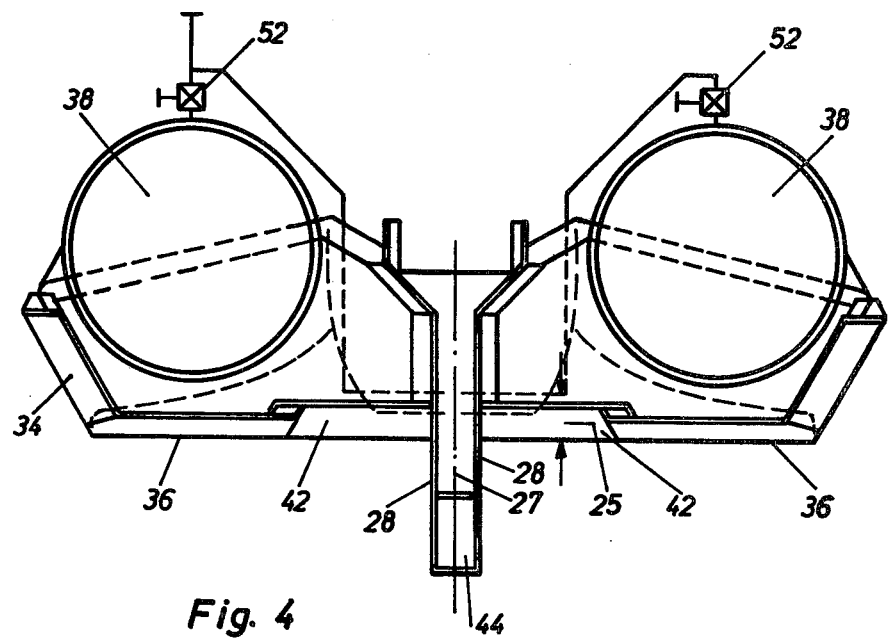
FIG. 4 is a cross section through the drag unit of the laying tool.

The laying tool consists of a drag unit 22 and a pulling tube 26 joined to each other by means of a cardanic suspension. The drag unit 22 comprises a body 34 and a ploughing means 27 similar to a keel and provided with a canal 43 which forms a pulling and a control system together with the pulling tube 26. The cable 24 is immersed from the vessel 23 and enters the drag unit 22 through the tube 26. In the drag unit 22 the pulling tube 26 passes to the canal 43, so designed that it forces the cable 24 down into the bottom of ploughed trench 29 before the ploughing means 27 leaves the trench.

The trench 29 in the sea-bottom 32 is ploughed of the ploughing means 27 under the body 34. Finally the system 22, 23 and 24 is provided with a number of sensors and which allow continuous supervision of the operation of the system and of the depth of the ploughing down of the cable.

The drag unit 22 which is being drawn on the bottom 32 consists of a body 34 on the side of which there is a central notch 42 at the back. In the middle of this notch is placed the ploughing means 27, the side walls 28 of which are plane and vertical. Inside this means 27 is the cable canal 43 and its outlet 44. It is possible to open the canal 43 at its top so that the cable can be placed inside the canal without pulling. The width of the means 27 should at first hand be determined by the diameter of the cable 24. This means 27 is in its front part provided with a ploughing tool consisting of an upper plough 48 and a lower plough 49, the upper plough being placed before the lower plough. This is necessary in order to shape the cable outflow 44 in such a way that the cable 24 is forced down into the bottom of the ploughed trench 29, even when the drag unit 22 does not work in a quite correct position. The ploughs 48, 49 are somewhat broader than the plough 28 of the ploughing means 27 and the upper plough 48 is broader than the lower plough 49. This arrangement reduces the friction and achieves that all the material turned up 31 is pushed aside in a broader trench 29 in order to be finally placed on the bottom 32 aside the dug trench 29. Thus the material 31 will not be pressed into the wall of the ploughed trench. Such a process would lead to essentially larger friction and too quick filling up of the trench. In front of the plough tool 48, 49 there is a plate, a stern frame 40 which serves, on the one hand, to split the bottom material and on the other hand to prevent objects from attaching to the ploughing tool 48, 49 and finally to force up the drag unit 22 entirely if this strikes a bottom material of such a nature that, otherwise, the ploughing means 27 could jam or if the bottom material is too hard to plough through. The shape of the leading edge 41 of the stern frame is thereby important. It is, on the one hand, somewhat broader than the rest of the stern frame in order to reduce the friction and, on the other hand, it is to have a surface which in combination with the weight of the drag unit causes the drag unit to be forced up when the bottom material is too hard, for example granite. Certain parameters based on model tests are to be observed in order to make the laying tool operate in an adequate manner. The edge 41 of the stern frame is to form an angle 7 with the bottom plane 36 of the body within the range of 20°–45° (See FIG. 5). Each plough 48, 49 is to consist of a lower 50 and an upper 51 plough surface, the edges of which form an angle 8, 9 which for the upper plough cutting edge lies within the range of 60°–120° 8 and for the lower one 90°–120° 9.

The ploughing depth 12 is essential for the shaping of the other parts of the drag unit. This depth 12 is defined as the difference between the height 33 of the ploughing means 27 and the depth of the central notch 42.

The bottom 36 of the body is mainly plane except for the central notch 42 and the stem 35. The dimensions of the body 34 are also essential for the ploughing capacity. The radius of curvature 13 is to exceed the ploughing depth 12 in the area in which it exceeds the plane bottom surface 36. The line defined by the beginning 15 of this curvature, i.e. the width of the plane bottom, should be at least 0.6 times the distance from said line to the projection of the point 5 of the lower plough on the bottom plane — a distance which in turn is 5-8 times the ploughing depth 12. Furthermore, the projection of the center of gravity 16 on the bottom plane 36 is to be within the sides of angles which are defined by the projection point of said plough point 5 and the end points of the line which defines the beginning of the curvature 15 of the stem. It is our experience that if these conditions are not fulfilled the laying tool will, for example have difficulties starting the ploughing, will plough unsatisfactorily in a "stem-down-position" and also will push a bank of loose material in front of itself. The stem 35 of the drag unit is, furthermore, to be angled, so as to avoid the risk that the drag unit be stopped by objects protruding from the sea-bottom.

Figure 6:
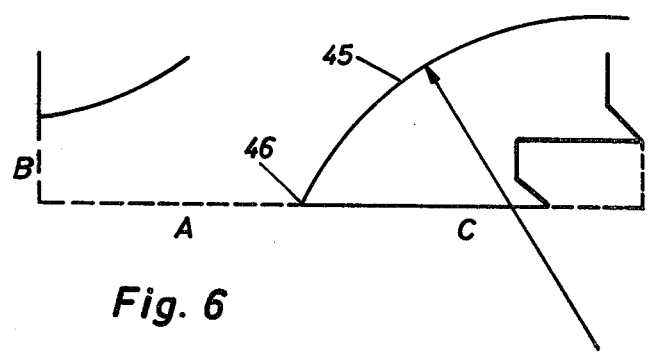
FIG. 6 is a detail of the plouging means.
Figure 5A:
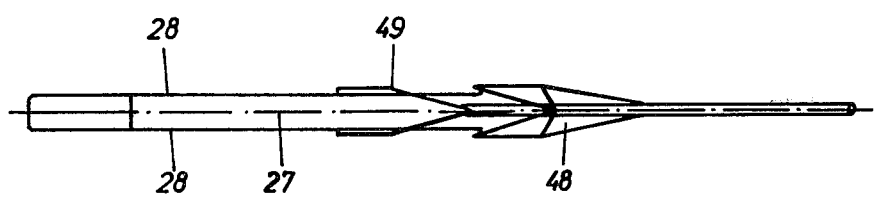
FIG. 5A is a plan view of a ploughing means protruding from the bottom of the drag unit.
Figure 5B:
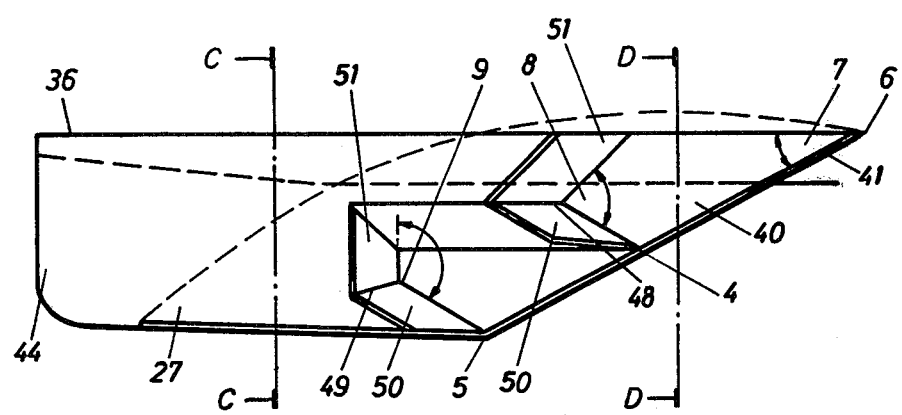
FIG. 5B is a side elevational view of the ploughing means.
Figure 5C:
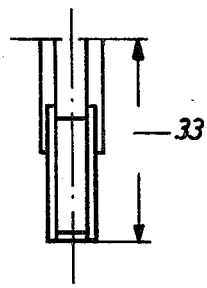
FIG. 5C is a diagrammatic sectional view taken on line C—C in FIG. 5B.
Figure 5D:
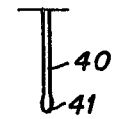
FIG. 5D is a diagrammatic sectional view taken on line D—D in FIG. 5B.
Figure 7:
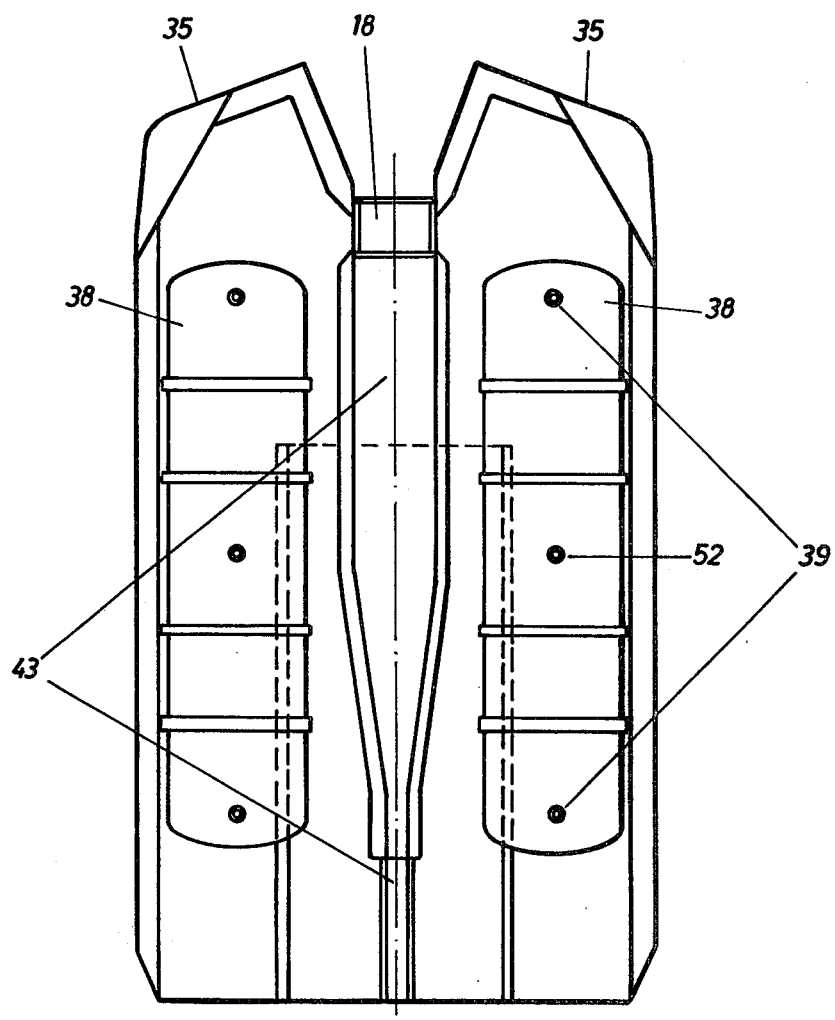
FIG. 7 shows a drag unit of the laying tool seen from above.

The cable 24 runs through the pulling tube 26 into the canal 43 and out through the outflow 44 in the ploughing means 27. The outflow will force the cable down into the bottom of the ploughed trench, before the ploughing means leaves the same behind. Therefore, it is necessary that the ploughing tool 48, 49 consists of the upper 48 and lower 49 ploughs which are displaced from one another, the upper plough being in front. Moreover, it is necessary that the outflow 44 is shaped as appears from FIG. 6, where

A = 3 D if D is the width of the ploughing means 27

B = 1.5 D

The radius of curvature R for the bottom 45 of the canal in front of the lower edge 46 of the outflow is to be at least 8 D. The canal bottom surface having this curvature is, as a maximum, to reach forward to the beginning 6 of the ploughing means. The distance between the front edge 46 of the outflow and the projection C of the point 4 of the upper plough on the bottom of the ploughed trench must not be too large and has to be below $\sqrt{H(2R-H)}$, where H is the height 33 of the ploughing means. Even the flexibility of the power cables plays an important role concerning these conditions. Therefore the width of the canal 43 is to increase towards the stem and to be at least 1.4 D when passing on to the pulling tube 26.

The suspension device 18 of the pulling and control device 26, 43 is, at the passing on between the canal 43 in the body of the drag unit and the pulling tube 26, to be shaped in a special way so as to make the laying tool operate in the intended manner in certain situations and to make it plough as correct as possible and with regard to the mechanical qualities of a power cable. The suspension device 18 is to be so shaped that it is turnable vertically as well as horizontally and, furthermore, that its cardan joint with the taps of one of the cardan crosses rest in a groove which can be opened. The fastening height over the bottom of the suspension arrangement 18 is to be below the ploughing depth 12 and its position in the horizontal plane is to be located within the distance of one ploughing depth in front of or behind the vertical plane through the line in the bottom plane where the curvature of the stem begins 15.

The laying tool is also provided with floating tanks 38 so adjusted that the tool floats without any cable, but sinks when a cable runs through it. These tanks 38 are, furthermore, provided with back valves 39 so adjusted that they allow automatic submergence, as long as the pressure in the tanks is lower than the pressure of the surrounding water. The tanks are provided with an air valve 52 in order to facilitate a filling of the tanks with air when refloating the laying tool for its recovery. Furthermore, the distribution of weight is to be so adjusted that the center of gravity 17 of the deplacement in the submarine position lies above the center of gravity 16 of the laying tool at a distance which is at least 1/10 of the distance from the line where the curvature of the stem begins 15 to the projection on the bottom plane 36 of the point 5 of the lower plough. In this way, the immersion procedure is automized, the drag unit 22 immerses steadily and no divers need to be nearby during the operation which could be risky to them.

We claim:

1. A tool for laying submarine cables comprising a drag unit for dragging along the sea-bottom and a pulling vessel, the drag unit comprising a body and a ploughing means supported by the body for ploughing a trench in a sea or ocean bottom, a pulling tube on said drag unit for guiding submarine cables from the pulling vessel to said drag unit and down into said trench, the underside surface of the body being substantially planar and having at the rear end of the body a central notch in the central part of which said ploughing means is disposed, said ploughing means being shaped as a keel the front part of which is in the form of two ploughs, inclusive of an upper broad plough and a lower narrow plough, the lower plough being placed behind the upper plough, said body having an inner part which occupies a part of the pulling tube which opens into the ploughing means somewhat spaced from the very back of the ploughing means, said ploughing means further comprising a stern frame having a leading edge extending from said notch in said body past the front of said upper plough to the front of said lower plough.

2. Laying tool as recited in claim 1, said edge forming an angle with the plane underside surface of the body within the range of 20°-45°.

3. Laying tool as recited in claim 1, the upper and the lower plough on each side of said stern frame having an upper first plough surface and a lower second plough surface, the angle between the first and the second plough surface for the upper plough being within the range of 60°-120° while the angle between the first and second plough surfaces for the lower plough is within the range of 90°-150°.

4. Laying tool as recited extending claim 3, said stern frame in forward to the upper and the lower plough surfaces of the two ploughs.

5. Laying tool as recited in claim 1, the rear part of the ploughing means having a plane underside extending rearwardly from the lower plough and including vertical walls without mechanical connection in the lowest part.

6. Laying tool as recited in claim 1, the pulling tube being fixed to the front end of the body by means of cardanic suspension which facilitates a certain movement of the tube with the cable inside, relative to the body vertically and horizontally.

7. Laying tool according to claim 6, the fastening of the cardanic suspension having a height over the bottom surface that is below the maximum ploughing depth defined by the height of the ploughing means reduced by the depth of the central notch in the rear end of the body.

8. Laying tool according to claim 6, the fastening for the cardanic suspension being placed within a distance of a ploughing depth in front of or behind the vertical plane through the line in the bottom plane where the curvature of the stem begins.

9. Laying tool according to claim 3, the ploughing surfaces having a width that exceeds that of the vertical part of the ploughing means, the upper plough being broader than the lower plough.

10. Laying tool according to claim 1, the leading edge of the stern frame being broader than the remaining part of the stern frame.

11. Laying tool according to claim 1, the laying tool being provided with floating tanks so adapted that the drag unit floats without any cable, but sinks when a cable runs through it.

12. Laying tool according to claim 11, the floating tanks being provided with back valves so adjusted that they allow automatic submersion in water as long as the pressure in the tanks is lower than the pressure of the surrounding water.

13. A tool for laying submarine cables comprising a drag unit for dragging along the sea-bottom and a pulling vessel, the drag unit comprising a body and a ploughing means supported by the body for ploughing a trench in a sea or ocean bottom, a pulling tube on said drag unit for guiding submarine cables from the pulling vessel to said drag unit and down into said trench, the underside surface of the body being substantially planar and having at the rear end of the body a central notch in the central part of which said ploughing means is disposed, said ploughing means being shaped as a keel the front part of which is in the form of two ploughs, inclusive of an upper broad plough and a lower narrow plough, the lower plough being placed behind the upper plough, said body having an inner part which occupies a part of the pulling tube which opens into the ploughing means somewhat spaced from the very back of the ploughing means, the distance from the projection on the bottom plane of the point of the lower plough to a line perpendicular to the length axis of the drag unit limiting the stem against the plane bottom of the body is 5–8 times the ploughing depth.

14. A tool for laying submarine cables comprising a drag unit for dragging along the sea-bottom and a pulling vessel, the drag unit comprising a body and a ploughing means supported by the body for ploughing a trench in a sea or ocean bottom, a pulling tube on said drag unit for guiding submarine cables from the pulling vessel to said drag unit and down into said trench, the underside surface of the body being substantially planar and having at the rear end of the body a central notch in the central part of which said ploughing means is disposed, said ploughing means being shaped as a keel the front part of which is in the form of two ploughs, inclusive of an upper broad plough and a lower narrow plough, being placed behind the upper plough, said body having an inner part which occupies a part of the pulling tube which opens into the ploughing means somewhat spaced from the very back of the ploughing means, said body having a curved stem whose curvature radius exceeds the maximum ploughing depth of the stem in the area which extends to the plane bottom surface.

15. A tool for laying submarine cables comprising a drag unit for dragging along the sea-bottom and a pulling vessel, the drag unit comprising a body and a ploughing means supported by the body for ploughing a trench in a sea or ocean bottom, a pulling tube on said drag unit for guiding submarine cables from the pulling vessel to said drag unit and down into said trench, the underside surface of the body being substantially planar and having at the rear end of the body a central notch in the central part of which said ploughing means is disposed, said ploughing means being shaped as a keel the front part of which is in the form of two ploughs, inclusive of an upper broad plough and a lower narrow plough, the lower plough being placed behind the upper plough, said body having an inner part which occupies a part of the pulling tube which opens into the ploughing means somewhat spaced from the very back of the ploughing means and a projection on the bottom plane at the center of gravity of the drag unit situated within a triangle determined by the projection of the point of the lower plough and the line, perpendicular to the longitudinal axis of the drag unit, which delimits the stem from the plane bottom of the body.

16. Laying tool according to claim 15, said line having a length that by 0.6 times exceeds the distance from said projection of the point of the lower plough to said line.

17. Laying tool according to claim 15, the center of gravity of the displacement in the submarine position lying above the center of gravity of the laying tool by a distance which is at least 1/10 of the distance from the projection on the bottom plane of the point of the lower plough to the line being perpendicular to the longitudinal axis of the drag unit that delimits the stem from the plane bottom of the body.

18. Laying tool according to claim 1, the drag unit being provided with a canal having a bottom with a curved portion having a curvature radius and so shaped that it merges with the lower end of the pulling tube and has such a form that the cable is forced down into the trench ploughed by the ploughing means.

19. Laying tool according to claim 18, said canal being furnished with a cover at its top so as to make it possible to open in order to allow the cable to be inserted without pulling.

20. Laying tool according to claim 18 said canal being provided with an outflow so shaped that the cable lies on the bottom of the ploughed trench the moment the rear end of the ploughing means leaves the trench.

21. Laying tool according to claim 18, the width of the canal being at least 1.4 times the width of the ploughing means at its beginning at the front part of the drag unit.

22. Laying tool according to claim 18, the curvature radius of the bottom of the canal being at least 8 times the width of the ploughing means before the outflow.

23. Laying tool according to any of the claim 18, the distance between the front edge of said outflow and the projection of the point of the upper plough on the bottom of the ploughed trench being less than $\sqrt{H(2R-H)}$ where H is the height of the ploughing means and R is the said curvature radius.

* * * * *